2,792,428
2,2'-ETHYLENE-BIS(6-TERTIARYBUTYL-PARA-CRESOL)

Josef Pikl, Glassboro, N. J., assignor to E. I. du Pont de Nemours and Company, Wilmington, Del., a corporation of Delaware No Drawing. Application April 17, 1953,
Serial No. 349,563

1 Claim. (Cl. 260—619)

This invention relates to new compounds of the benzene series, and more particularly to the preparation of 2,2'-ethylene bis(6-tertiary butyl para-cresol) which has been found to be of particular value as an anti-oxidant, and especially as a non-discoloring, odorless anti-oxidant for elastomers.

Although a variety of effective anti-oxidants, such as the diarylamines, are available for rubber and other elastomers when the color developed by the anti-oxidant on aging is not objectionable, non-discoloring compounds suitable for use in colorless, white, or light-colored stocks and at the same time sufficiently effective as anti-oxidants are difficult to obtain. Simple phenols, such as para-hydroxydiphenyl, have been used and have more recently been supplemented by dihydric phenols which contain the diphenylmethane nucleus, such as 2,2'-ethylidene bis(4,6-dimethylphenol) and 2,2'-methylene bis(4-methyl-6-tertiary butyl phenol). It has been found that the effectiveness of compounds of this type as anti-oxidants varies greatly, in a way not understood. The relative positions of the hydroxyl groups, the size, structure and position of substituting alkyl groups, all seem to have an influence, but in each case the effect cannot be predicted. Non-discoloring anti-oxidants which are odorless and which otherwise do not impart undesirable properties to elastomers are needed by the industry.

It is therefore an object of this invention to produce a new chemical compound which exhibits desirable properties as an anti-oxidant, particularly for elastomers. It is a further object of the invention to produce as a new compound 2,2'-ethylene bis(6-tertiary butyl p-cresol).

I have found that 2,2'-ethylene bis(6-tertiary butyl-p-cresol) having the formula:

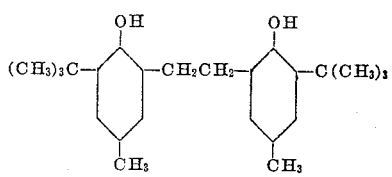

is an effective non-discoloring anti-oxidant for elastomers such as rubber and the synthetic elastomers in general, including the polychloroprene and polybutadiene elastomers of commerce, and that it has general utility as an anti-oxidant in other fields where anti-oxidants of the phenol types are useful.

To prepare the compound of this invention, 2-tertiary butyl p-cresol is reacted with formaldehyde in a caustic alkalimethanol solution to produce the 2-tertiary butyl-6-methanol p-cresol which in turn is brominated to give 2-tertiary butyl-6-bromomethyl p-cresol. The latter compound, after blocking the hydroxyl group such as by forming the acetate, is condensed to produce the 2,2'-ethylene bis(6-tertiary butyl p-cresol).

The following examples are given to illustrate the preparation of the 2,2'-ethylene bis(6-tertiary butyl p-cresol) and its use as an anti-oxidant in elastomers.

Example 1

2-tertiary butyl-p-cresol (492 grams) is dissolved in a mixture of 50 cc. of methanol, 60 grams of caustic soda and 340 grams of water. To this solution is added 267 grams of 35% formaldehyde solution and the mass is agitated at room temperature for 3 hours. After the reaction is completed water is added and the reaction product dissolved in petroleum ether and washed with water. On cooling, the 2-tertiary butyl-6-methylol-p-cresol crystallizes from the petroleum ether. It has a melting point of from 85° to 88° C.

This methylol derivative is treated in benzene solution with gaseous hydrogen bromide in the presence of calcium chloride at room temperature. The reaction proceeds as fast as the hydrogen bromide is introduced, the calcium chloride taking up the water formed in the reaction. The yield of 2-tertiary-butyl-6-bromomethyl-p-cresol is substantially quantitative.

The above bromomethyl derivative is reacted for one hour with 1.5 mols of acetic anhydride per mol of the bromomethyl derivative and a few drops of concentrated sulfuric acid at 60° to 80° C. and then the product is distilled in high vacuum. The bromomethyl-acetate distills without decomposition at 115° to 120° C. at a pressure of 0.5 mm. of mercury. Analysis shows it has 25.6% bromine (theory: 26.6%).

80 grams of the bromomethyl acetate is dissolved in 200 cc. of anhydrous ether and then added to 23 grams of magnesium turnings and 0.2 gram of anhydrous cuprous chloride. The reaction starts quickly and is held at 30° to 33° C. by controlling the addition of the bromomethyl acetate. The reaction product is decomposed with dilute acid and the acetate group hydrolyzed by warming for one hour with alcoholic caustic to 80° C. The reaction product is recovered by acidification and distillation in high vacuum to separate the 2,2'-ethylene bis(6-tertiary-butyl-p-cresol) from a lower boiling fraction. The fraction distilling at 160° to 180° C. at a pressure of 0.5 mm. of mercury is 2,2'-ethylene bis(6-tertiary butyl-p-cresol). When crystallized from petroleum ether, it forms colorless crystals melting at 104° to 106° C. Analysis shows it to have 82.2% carbon and 10.18% hydrogen.

Example 2

The 2,2'-ethylene bis(6-tertiary butyl-p-cresol) was tested as a non-discoloring anti-oxidant for rubber in the following white stock, the parts being by weight.

| | |
|---|---|
| Pale crepe rubber | 100 |
| Benzothiazyl disulfide | 0.6 |
| Dibutyl ammonium oleate | 0.5 |
| Zinc oxide | 10 |
| Titanium oxide | 10 |
| Stearic acid | 2 |
| Light process oil | 5 |
| Sulfur | 2.75 |
| Anti-oxidant | 1 |

Test pieces were vulcanized for 30 minutes at 40 lbs. steam pressure and were then given an accelerated aging test in a bomb at 70° C. and 300 lbs. pressure of oxygen. The tensile properties were determined before aging and at the end of 7 and 14 days. The results are reported below in terms of the percentage of the original tensile strength retained after the varying aging periods. 2,2'-methylene bis(4-methyl-6-tertiary-butyl phenol), a non-discoloring rubber anti-oxidant now on the market, was used for comparison.

| Days in Bomb | 2,2'-ethylene bis(6-tertiary butyl-p-cresol) | 2,2'-methylene bis-(4-methyl-6-tertiary-butyl phenol) |
|---|---|---|
| | Percent | Percent |
| 7 | 99 | 100 |
| 14 | 86 | 74 |

The compound of this invention may be incorporated in the elastomer to be protected against oxidation, in any of the ways commonly used for incorporating solid organic rubber chemicals. Quantities between 0.25% and 2.5% by weight of the elastomer are usually most suitable. The compound may be used without restriction with the usual rubber pigments, fillers, plasticizers, vulcanizing agents and accelerators. It may be used as a non-discoloring anti-oxidant not only with natural rubber but also with the synthetic elastomers, for example, those made by polymerization of butadiene and substituted butadiene such as chloroprene, either alone or with polymerizable olefinic compounds. Well known examples are neoprene and GR-S rubber.

I claim:

2,2'-ethylene bis(6-tertiary butyl p-cresol).

References Cited in the file of this patent

UNITED STATES PATENTS

| | | |
|---|---|---|
| 2,321,620 | Pratt | June 15, 1943 |
| 2,514,218 | Albert | July 4, 1950 |
| 2,514,347 | Dunlap | July 4, 1950 |
| 2,542,688 | Johnson et al. | Feb. 20, 1951 |
| 2,549,118 | Newby | Apr. 17, 1951 |
| 2,653,979 | Kropa et al. | Sept. 29, 1953 |
| 2,762,787 | Goodman et al. | Sept. 11, 1956 |

OTHER REFERENCES

Hultsch: Chem. Abstracts, vol. 37 (1943), col. 4059-60 (1 page).